(12) United States Patent
Kohavi et al.

(10) Patent No.: US 8,341,756 B2
(45) Date of Patent: Dec. 25, 2012

(54) SECURING DATA IN A NETWORKED ENVIRONMENT

(75) Inventors: Ran Kohavi, Ramat-HaSharon (IL); Ran Oelgiesser, Tel-Aviv (IL); Yizhak Levy, Tel-Aviv (IL)

(73) Assignee: Kidaro (Israel) Ltd., Ramat-Gan (IL)

( * ) Notice: Subject to any disclaimer, the term of this patent is extended or adjusted under 35 U.S.C. 154(b) by 409 days.

(21) Appl. No.: 12/087,866

(22) PCT Filed: Jan. 17, 2007

(86) PCT No.: PCT/IL2007/000058
§ 371 (c)(1),
(2), (4) Date: Oct. 15, 2008

(87) PCT Pub. No.: WO2007/083300
PCT Pub. Date: Jul. 26, 2007

(65) Prior Publication Data
US 2009/0063869 A1  Mar. 5, 2009

Related U.S. Application Data

(60) Provisional application No. 60/759,043, filed on Jan. 17, 2006.

(51) Int. Cl.
*G06F 7/04* (2006.01)
(52) U.S. Cl. ......................................................... 726/27
(58) Field of Classification Search ........................ None
See application file for complete search history.

(56) References Cited

U.S. PATENT DOCUMENTS

| | | | |
|---|---|---|---|
| 5,812,843 A | 9/1998 | Yamazaki et al. | |
| 6,131,096 A | 10/2000 | Ng et al. | |
| 6,178,443 B1 | 1/2001 | Lin | |
| 7,216,225 B2 | 5/2007 | Haviv et al. | |
| RE43,103 E * | 1/2012 | Rozman et al. | 726/23 |
| 2002/0002673 A1* | 1/2002 | Narin | 713/152 |
| 2002/0059517 A1* | 5/2002 | Haviv et al. | 713/154 |
| 2003/0169305 A1 | 9/2003 | Hodges | |
| 2006/0010433 A1 | 1/2006 | Neil | |
| 2006/0041620 A1 | 2/2006 | Nandhra | |
| 2006/0059253 A1 | 3/2006 | Goodman | |
| 2006/0136910 A1 | 6/2006 | Brickell et al. | |
| 2006/0136911 A1 | 6/2006 | Robinson et al. | |
| 2006/0136912 A1 | 6/2006 | Robinson et al. | |
| 2010/0058190 A1 | 3/2010 | Hodgson | |

FOREIGN PATENT DOCUMENTS

| | | |
|---|---|---|
| JP | 11-338810 | 12/1999 |
| JP | 2004-528609 A | 9/2004 |
| WO | WO 0190838 A2 | 11/2001 |
| WO | WO 2007/083299 | 7/2007 |
| WO | WO 2007/083300 | 7/2007 |

OTHER PUBLICATIONS

Patent Cooperation Treaty, Written Opinion of the International Searching Authority, Sep. 29, 2008, PCT/IL07/000058. Chen, "The Old New Thing—Running old programs in a virtual machine doesn't necessarily create a good user experience", MSDN, Oct. 5, 2005, 10 pages.

\* cited by examiner

*Primary Examiner* — Brandon Hoffman
(74) *Attorney, Agent, or Firm* — Woodcock Washburn LLP

(57) ABSTRACT

Apparatus for securing data, comprising: an isolated processing environment having a boundary across which data cannot cross and a channel for allowing data to cross the boundary. A filter restricts data passage across the channel. Protected data is initially located in a secure area and is only released to such a secure processing environment so that access for authorized users to the secure data is available, but subsequent release of the secure data by the authorized users to the outside world is controlled.

21 Claims, 11 Drawing Sheets

SECURING DATA IN A NETWORKED ENVIRONMENT

FIELD AND BACKGROUND OF THE INVENTION

The present invention relates to data security and, more particularly, but not exclusively to a method and apparatus for securing data in a networked environment.

As modern information technology evolves, communication channels become faster and more versatile, enterprise Information Technology (IT) infrastructure becomes more complex, and there arises a need to store and process growing amounts of information.

The growing amounts of information raise the need to secure confidential information used for business or personal purposes.

Threats to the security of an IT infrastructure can be roughly divided into two groups: Intrusions to organizational IT infrastructures, and Information Leakage.

Intrusions to organizational IT infrastructures may include, but are not limited to introduction of Malicious Content (Malware) into the organizational IT infrastructure.

Malicious Content may be classified into several categories: computer viruses—malicious computer programs that replicate themselves, worms—computer programs which quickly spread through a computer network and clog up the network, spyware—deceptive software that installs itself on a computer and allows an outsider to harvest private information, and trojan horses—programs that appear to have some useful or benign purpose but really mask some hidden malicious code.

These threats are commonly addressed by inspecting, blocking or filtering data when entering the organization (using firewalls, anti-viruses, mail filters etc., as known in the art).

The threats may also be addressed by monitoring the processing of incoming data, and blocking operations that attempt to violate security policies (using intrusion detection/prevention systems, anti-spyware, sandboxing etc., as known in the art).

Information Leakage threats are threats which originate from entities within the organization, who convey information to entities that are not authorized to access the information conveyed.

The unauthorized entities may include entities within the organization (say one of the organization's junior employees), entities that are external to the organization (say an employee of a competitor), etc.

The leakage of the information may be deliberate or accidental. The leakage may also be caused by malicious content (such as spyware introduced into the organizational IT infrastructure, as described hereinabove).

Information Leakage is more difficult to recognize as it rarely involves an immediate noticeable damage to the IT infrastructure.

Moreover, confidential data is part of every day operations, and sharing the confidential data within and sometimes out of the organization (with partners, customers, etc) is essential to business, and legitimate behavior or workflow is hard to define.

Existing solutions usually require classification of organizational data and restricting the operations of users when processing confidential data or accessing sensitive sources. However, existing solutions create tradeoffs between protection and usability.

Today, organization's awareness of the need to secure confidential information is augmented by recent legislation and regulations such as the Gramm-Leach-Bliley Act, Health Insurance Portability and Accountability Act, NASD 2711, Sarbanes-Oxley Act, and the Basel Capital Accord.

The recent legislation and regulations acknowledge the risk of exposing personal information, and is enforced on organizations that deal with sensitive private information, such as healthcare providers, law enforcement agencies, insurance companies, and financial institutions to protect sensitive private information against theft or leakage.

Current legislation also enforces the use of auditing and forensics tools to enable damage control and tracking down of the information leakage sources.

Currently, several methods are implemented for protecting organizations against information leakage.

Device control—is a method which includes a range of solutions that eliminate the ability of a user to write information to an outgoing data channel such as portable memory devices, communication devices such as modems, bluetooth and wifi devices, CD writers, floppy discs, etc. Device control methods prevent unauthorized transfer of information out of the organizational systems. However device control methods provide no protection against transfer via day-to-day communication channels that are essential to business and cannot be blocked, such as e-mail, web, instant messaging, etc.

Pattern based blocking—a method which analyzes the information that is transported over communication channels, usually uses a gateway or an endpoint filter. Pattern based blocking applies pre-defined patterns (a.k.a. data signatures) to allow or block the transport of information outside the endpoint or the organizational network.

Heuristic behavior analysis—is a method which monitors user and application behavior, and compares the monitored behavior with a set of pre-defined policies and heuristics, that comprise the company's security policy. Actions that violate the security policy of the company are blocked or restricted. An exemplary product which implements the method is SureView™, by Oakley networks Inc.

However, Heuristic behavior analysis has difficulties in defining legitimate behavior of users or applications. Heuristic behavior analysis fails to detect information leaks by sophisticated users or malicious applications that use what seems to be day-to-day communication.

Authentication and content encryption—a method which allows only authorized users to access pre-defined confidential data or sources. The users have to pass identification and authentication process prior to accessing the predefined confidential data.

Encryption is a common method that helps enforcing the authorized access, and prevents unauthorized users from actually reading the data, even if they manage to get the data itself. An example of such a product is SafeGuard™ by Utimaco Safeware AG.

Authentication and content encryption solutions protect against unauthorized use of data by unauthorized or unauthenticated users or machines. But when dealing with intentional information theft, authentication and content encryption solutions fail to prevent an authorized user or a malicious code running on an authorized user's computer, from exploiting its access privileges to leak data, for instance by copying the data to another document that is not encrypted, print the data, etc.

Rights management solutions, as provided by Microsoft may be positioned for instance on top of Windows™ servers, and extended by products such as Liquid Machines™'s document control for Microsoft™ RMS.

Rights management solutions are based on classifying files created by Microsoft™ RMS enabled applications into different confidentiality levels. Each confidentiality level is associated with permissions to certain computers, users, or groups and can restrict viewing, editing, printing, using copy-paste, forward and save. The permissions may be set by the authoring user or according to administrator policy template.

However, rights management solutions protect against unauthorized users or machines, but cannot prevent authorized users from exploiting their access privileges. The permissions are enforced by specific applications. An authorized user may use a different application to bypass usage restrictions.

Some current systems create a classified area or network within the organization, to which only classified computers are connected. The classified area is the only place where confidential data is created, stored, or processed. Some systems use virtual segregation instead of physically segregating between two endpoint computers. The systems implement one or more of the following technologies:

Remote desktop technologies, such as Terminal Services™ and Citrix™, allow a user to access and perform actions on remote environments that are physically or virtually separated from the user's endpoint computer.

By itself, remote desktop technology is not a security system, but it may be used as a platform to create segregation between environments. With the remote desktop technologies, confidential data is held within a network that is accessible only to the servers on which the remote desktop sessions are operating. The user endpoint computer only gets a primitive representation of the information, with no ability to save or distribute the confidential information out of the classified network.

Virtual machine systems, such as Microsoft Virtual PC™ and VMWare™, allow a user to create virtual machines within the user endpoint device. The virtual machine acts as a separated physical computer and may be used as a platform for environment segregation.

To further enhance the protection of confidential data, such solutions enable encryption of the virtual machine storage devices, preventing any access from the endpoint device itself.

Yang Yu from the Computer Science Department of the Stony Brooks University et al, in proceedings of the 4$^{th}$ workshop on Digitals Rights Management, in Washington D.C., on Oct. 25, 2004, described a Display Only File Server (DOFS). Yang Yu's DOFS stores enterprise sensitive files on a protected server and prevents bits of the files from physically leaving the server. However, users can still read or write these files through standard applications such as PDF reader or MS Word.

U.S. Pat. No. 6,922,774, to Meushaw, filed on May 14, 2001, entitled "device for and method of secure computing using virtual machines", describes the use of virtual machines to create a secured environment, where different virtual machines are created for various levels of confidentiality. Meushaw also describes a secured online communication between the classified environments using encryption to prevent unauthorized access from other environments.

U.S. Pat. No. 6,836,888, to Basu, filed on Mar. 17, 2000, entitled "System for reverse sandboxing" describes the use of a sandbox, which is virtually separated from the endpoint device, thus allowing processing of confidential data within the sandbox, and eliminating the risks that reside within an untrusted endpoint device.

The segregation-based solutions described hereinabove focus on protecting confidential sources that are part of, or accessible from within the confidential environment or machine, blocking unauthorized access from other environments, thus locking all confidential data within a limited environment.

However, the segregation-based solutions described hereinabove do not protect and sometimes do not even allow the transportation of information via platforms that are not part of the secure environment. Examples for such platforms include: storage servers (file systems, database), communication servers (for messaging, e-mail, web access, etc) and even personal devices (say USB portable memory devices).

Furthermore, the methods described hereinabove require a separate set of systems and platforms or well defined regions dedicated for confidential data. The regions have to be well separated and protected from the rest of the network. The regions are limited with respect to using the network's infrastructure and systems.

There is thus a widely recognized need for, and it would be highly advantageous to have, a system devoid of the above limitations.

SUMMARY OF THE INVENTION

According to one aspect of the present invention there is provided an apparatus for securing data, the apparatus comprising: a secure environment definer configured to define a secure environment within an existing user environment, the definer configured to define a boundary about the environment across which data cannot pass and a channel out of the secure environment, the secure environment definer further being configured to define a filter associated with the channel out of the secure environment, the filter being definable to control passage of data out of the secure environment.

According to a second aspect of the present invention there is provided an apparatus for securing data, comprising: at least one isolated processing environment, associated with at least one respective predefined classified area of data sources, and operable to receive a data unit from the respective classified area, wherein the isolated processing environment is installed on an endpoint computer; and an output restrictor, associated with the isolating processing environment and configured to restrict outputting of the data unit from the isolated processing environment according to a predefined policy.

According to a third aspect of the present invention there is provided an apparatus for securing data, comprising: an isolated processing environment, associated with a predefined classified area of data sources, having a boundary across which data cannot pass and a channel for passage of data across the boundary, the isolated processing environment being operable to receive a data unit from the classified area, wherein the isolated processing environment is installed on an endpoint computer; a data classifier, associated with the isolated processing environment, and configured to classify the data unit, according to a predefined policy; an output restrictor, associated with the channel and configured to restrict the outputting of the data unit across the channel, according to the classification; and an output data modifier associated with the output restrictor and configured to modify the output data unit, according to the classification.

According to a fourth aspect of the present invention there is provided an apparatus for securing data, comprising: an isolated processing environment, associated with a predefined classified area of data sources, wherein the isolated processing environment is installed on an endpoint computer; and an input restrictor, associated with the isolating processing environment, and configured to restrict input of a data unit into the isolated processing environment, wherein the isolated processing environment is further operable to forward the input data unit to the classified area.

According to a fifth aspect of the present invention there is provided an apparatus for securing data, comprising: an isolated processing environment, associated with a predefined classified area of data sources, wherein the isolated processing environment is installed on an endpoint computer, the isolated processing environment comprising a boundary across which data cannot pass and a channel for allowing data to pass across the boundary; an input restrictor, associated with the channel, and configured to restrict input of a data unit into the isolated processing environment; and an input data modifier, associated with the input restrictor and configured to modify the input data unit according to a predefined policy; and wherein the isolated processing environment is further operable to forward the input data unit to the classified area.

According to a sixth aspect of the present invention there is provided a system for securing data, comprising: at least two isolated processing environments, each environment comprising a boundary across which data cannot pass and a channel through which data may cross said boundary, each environment operatively associated with a respective predefined classified area of data sources thereby to receive a data unit from the classified area, and installed on an endpoint computer; and at least two output restrictors, each output restrictor associated with a channel of a respective one of said isolating processing environments and configured to control outputting of the received data unit from the isolated processing environment.

According to a seventh aspect of the present invention there is provided a kit for securing data, embodied on a computer readable medium, the kit comprising: an isolated processing environment definer, operable to define an isolated processing environment comprising a boundary across which data may not pass and a channel through which data may cross the boundary, the environment being associateable with a predefined classified area of data sources on an endpoint computer; and an output restrictor, installable on the endpoint computer, and configured to restrict outputting of the data unit through the channel.

According to an eighth aspect of the present invention there is provided a method for securing data, comprising: a) creating an isolated processing environment at an endpoint computer, by defining a boundary across which data may not pass and a channel across which data may pass across the boundary; b) receiving within the isolated processing environment a data unit originating from a predefined classified area associated with the isolated processing environment; and c) monitoring the channel in order to restrict outputting of the received data unit from the isolated processing environment.

According to an eighth aspect of the present invention there is provided a method for securing data, comprising a) creating an isolated processing environment at an endpoint computer, by defining a boundary across which data may not pass and a channel across which data may pass across the boundary; b) monitoring the channel to restrict input of data units to the isolated processing environment; and c) forwarding the restricted input data units from the isolated processing environment to a classified area associated with the isolated processing environment, thereby to protect data input to the classified area.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1A:
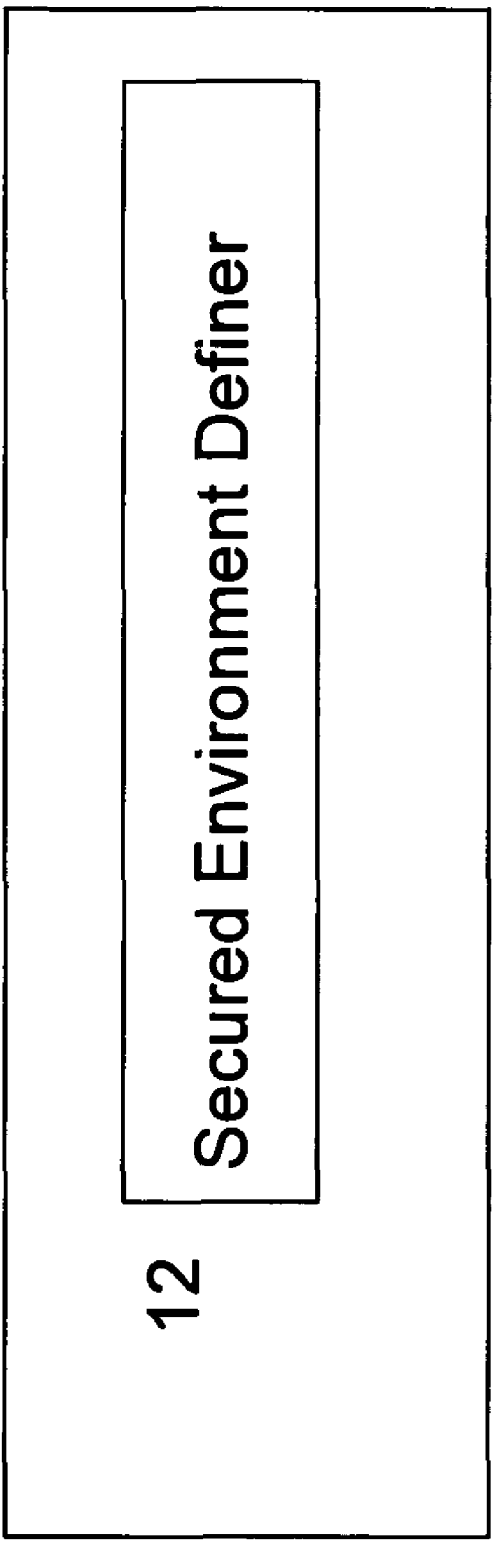
FIG. 1a is a simplified block diagram illustrating a first apparatus for securing data, according to a preferred embodiment of the present invention.

The present embodiments comprise an apparatus and method for securing data, comprising: an isolated processing environment having a boundary across which data cannot cross and a channel for allowing data to cross the boundary. A filter restricts data passage across the channel. Protected data is initially located in a secure area and is only released to such a secure processing environment so that access for authorized users to the secure data is available, but subsequent release of the secure data by the authorized users to the outside world is controlled.

The principles and operation of an apparatus according to the present invention may be better understood with reference to the drawings and accompanying description.

According to a preferred embodiment of the present invention, there are provided one or more isolated processing environments, installed on an endpoint computer, such as a desktop PC used by one of the users in a networked environment.

The isolated processing environment is a secured and separate environment, which is used for running applications, processing data, storing data, or a combination thereof. The isolated processing environment may be a logical entity implemented on a user's desktop computer, a user's laptop computer, etc. An example for such an isolated processing environment is a virtual machine, containing a full operating system running on top of an existing desktop. The isolated processing environment may be implemented using current products, such as VMWare™ Workstation, and Microsoft™ Virtual PC.

The isolated processing environment is used as part of the user environment, capable of running applications and processing data units.

The isolated processing environment (IPE) is a secured and separated environment, in a way that by default, no entity but the user has access to data which resides in the IPE, applications which run in the IPE, etc. The isolated processing environment functions as a separated computer.

The isolated processing environment may be part of or have free access to a classified area predefined by a user or administrator. The classified area is a predefined area which includes one or more data sources that hold data units. The classified area may be implemented using any of methods known in the art. The classified area may include databases, servers, etc, as described in further detail hereinbelow.

According to a preferred embodiment, the input and output of data units (such as files, emails, messages, clipboard content and any other data units) from the isolated processing environment is controlled in accordance with a policy predefined by a user or administrator, as described in further detail hereinbelow.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1a, which is a simplified block diagram illustrating a first apparatus for securing data, according to a preferred embodiment of the present invention.

Apparatus 100 for securing data includes secure environment definer 12, which may be used to define a secure environment within an existing user environment, say an endpoint computer such as a user's laptop computer, a user's desktop computer, etc.

The definer secure environment 12 is also used to define a boundary about the secure environment across which data cannot pass and a channel out of the secure environment.

The secure environment definer 12 is also used to define a filter connected to the channel out of the secure environment. The filter is defined to control passage of data through the channel and thus out of the secure environment.

Preferably, a user or administrator may define a classified area of data sources, as described in further detail. Data from the classified area is allowed to flow only to the defined secure environment, as described in further detail hereinbelow.

Figure 1B:
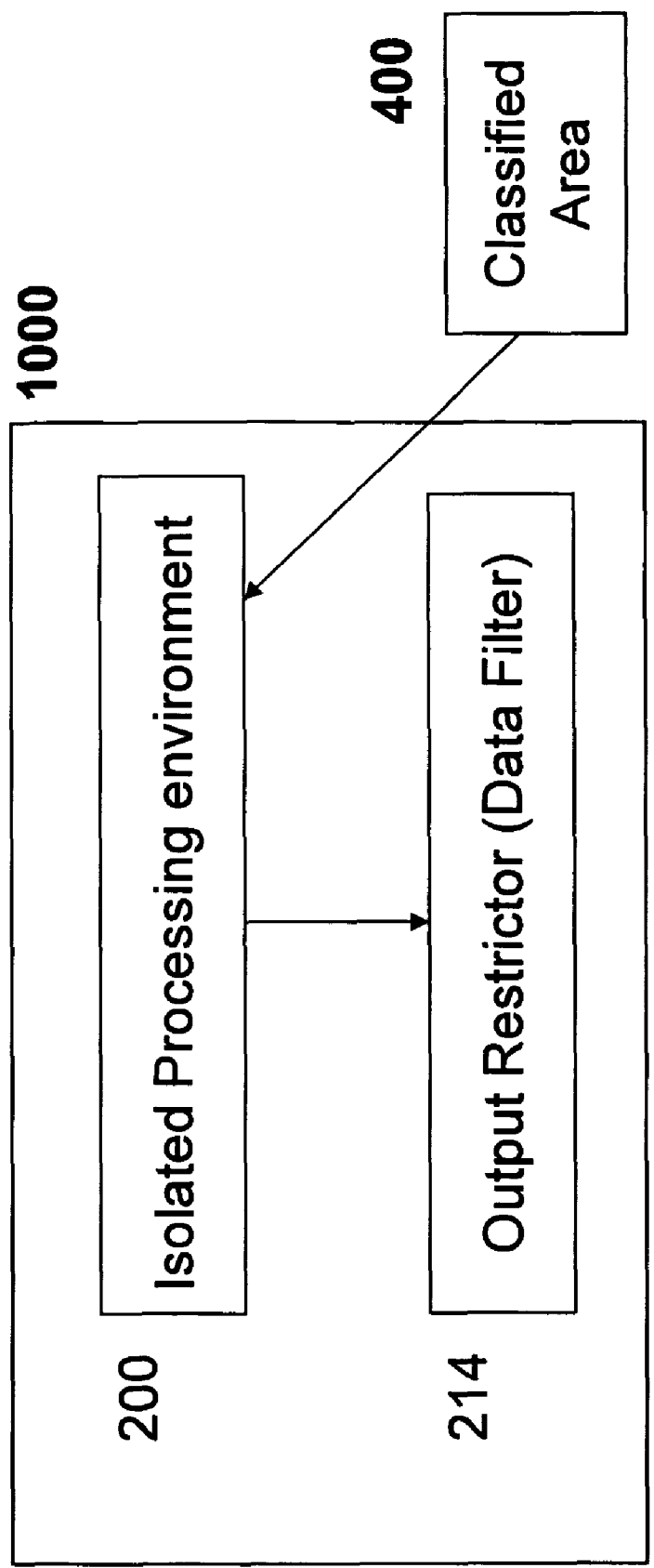
FIG. 1b is a simplified block diagram illustrating a second apparatus for securing data, according to a preferred embodiment of the present invention.

Reference is now made to FIG. 1b, which is a simplified block diagram illustrating a second apparatus for securing data, according to a preferred embodiment of the present invention.

Apparatus 1000 for securing data includes an isolated processing environment 200, installed on an endpoint computer, say a user's laptop computer, a user's desktop computer, or any other endpoint computer device, as known in the art.

The isolated processing environment (IPE) 200 is connected to a classified area 400 of data sources.

The classified area 400 may be defined by a user or administrator of the apparatus 1000. The classified area 400 may include data sources such as devices (say a database server), network sources (say an intranet network), etc, as known in the art.

Optionally, the classified area 400 includes data sources external to the endpoint computer on which the isolated processing environment 200 is implemented. For example, the classified area 400 may include database servers located in a local network connected to the endpoint computer.

The isolated processing environment (IPE) 200 is allowed to access and may be operated to receive a data unit from the classified area 400. The data unit may be stored or processed in the isolated processing environment 200 in an isolated manner.

That is to say, a user may import the data unit from the classified area 400 into the isolated processing environment 200, provided the user is authorized to use the isolated processing environment 200 for accessing the data unit, as described in further detail hereinbelow. The imported data unit may be processed, stored, edited, etc, in the isolated processing environment 200, as described in further detail hereinbelow.

Apparatus 1000 also includes an output restrictor 214 (say a data filter) connected to the isolating processing environment 200.

The output restrictor 214 restricts outputting of the data unit from the isolated processing environment 200 according to a predefined policy.

The output restrictor 214 detects an attempt to output the data unit from the isolated processing environment 200. The output restrictor 214 determines if the data units is allowed to be output from the isolated processing environment 200.

For example, a user's attempt to write a confidential data unit from the isolated processing environment 200 into a file in an area out of the classified area 400 may be blocked, according to a policy predefined by a user or administrator of the apparatus 1000.

Figure 1C:
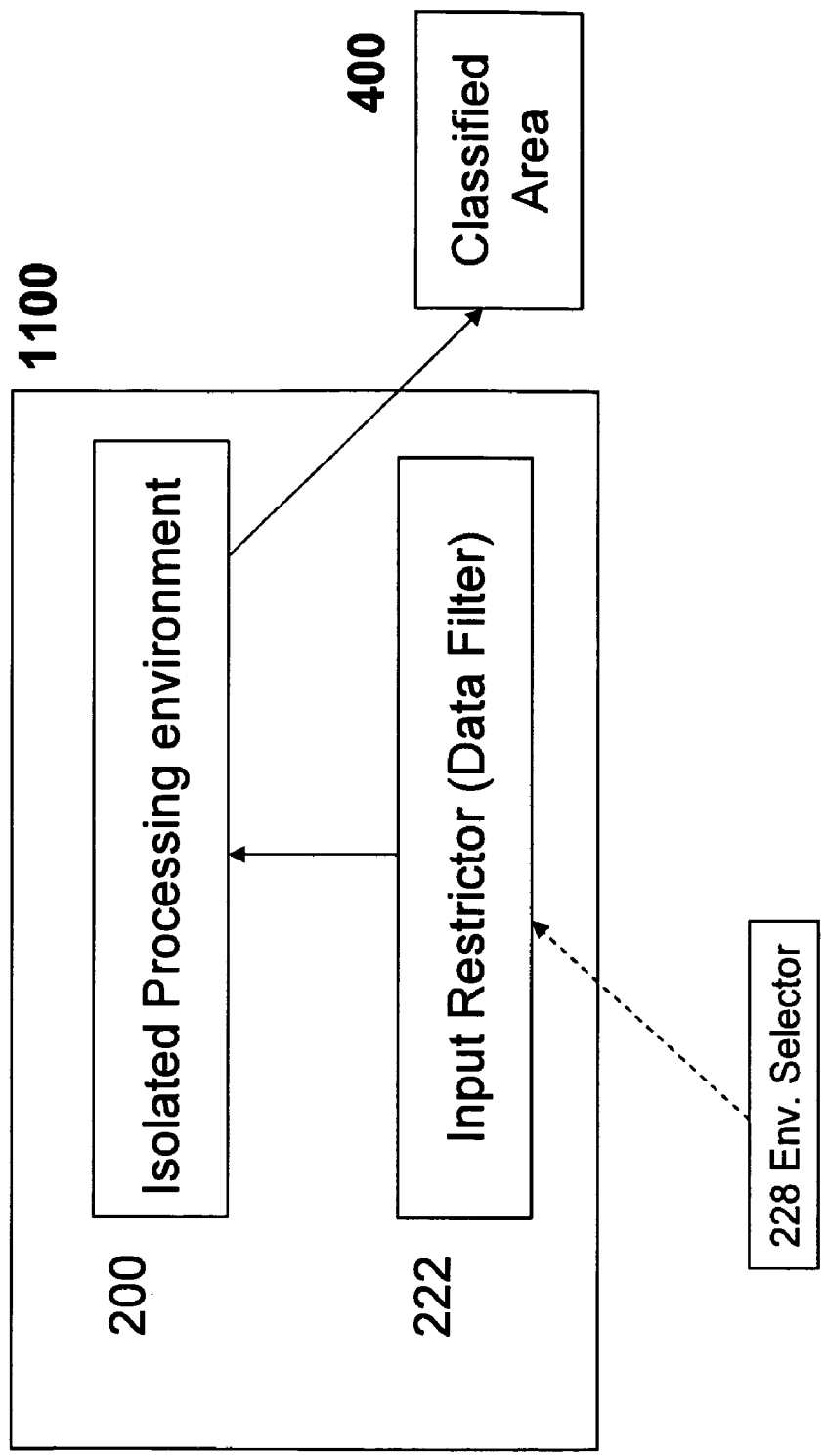
FIG. 1c is a simplified block diagram illustrating a third apparatus for securing data, according to a preferred embodiment of the present invention.

Reference is now made to FIG. 1c, which is a simplified block diagram illustrating a third apparatus for securing data, according to a preferred embodiment of the present invention.

Apparatus 1100 for securing data includes an isolated processing environment 200, as described in further detail hereinabove.

The isolated processing environment 200 is installed on an endpoint computer, say a user's laptop computer, a user's desktop computer, or any other endpoint computer device, as known in the art.

The isolated processing environment (IPE) 200 is connected to a classified area 400 of data sources, as described in further detail hereinabove.

Apparatus 1100 also includes an input restrictor 222, connected to the isolated processing environment, say a data filter. The input restrictor 222 may also be deployed inside the isolated processing environment, as described in further detail hereinbelow.

The input restrictor 222 restricts the inputting of the data unit into the isolated processing environment 200. Preferably, the input restrictor 222 also restricts the inputting of a data unit into the classified area 400, as defined hereinabove.

The input restrictor 222 determines whether the inputting of the data unit is to be blocked, allowed, etc. For example, the input restrictor 222 may allow access to the data unit from the isolated processing environment 200, as described in further detail hereinbelow.

Preferably, the input restrictor 222 may also determine that a certain action has to be performed prior to inputting the data unit, as described in further detail hereinbelow.

Once the data unit is allowed access from the isolated processing environment, the data unit may be forwarded to the classified area 400. For example, a user may choose to store the data unit in a database in the classified area 400, provided the user is an authorized user of the isolated processing environment 200.

Optionally, the input restrictor 222 is connected to, or is a part of an environment selector 228.

The environment selector 228 tracks movement of a data unit in the computer, determines the classification group of the data unit, and activates relevant authentication and authorization processes to permit the user's access to the data unit. Then, the environment selector 228 may transfer the data unit for further processing in the isolated processing environment 200, as described in further detail hereinbelow.

Figure 1D:
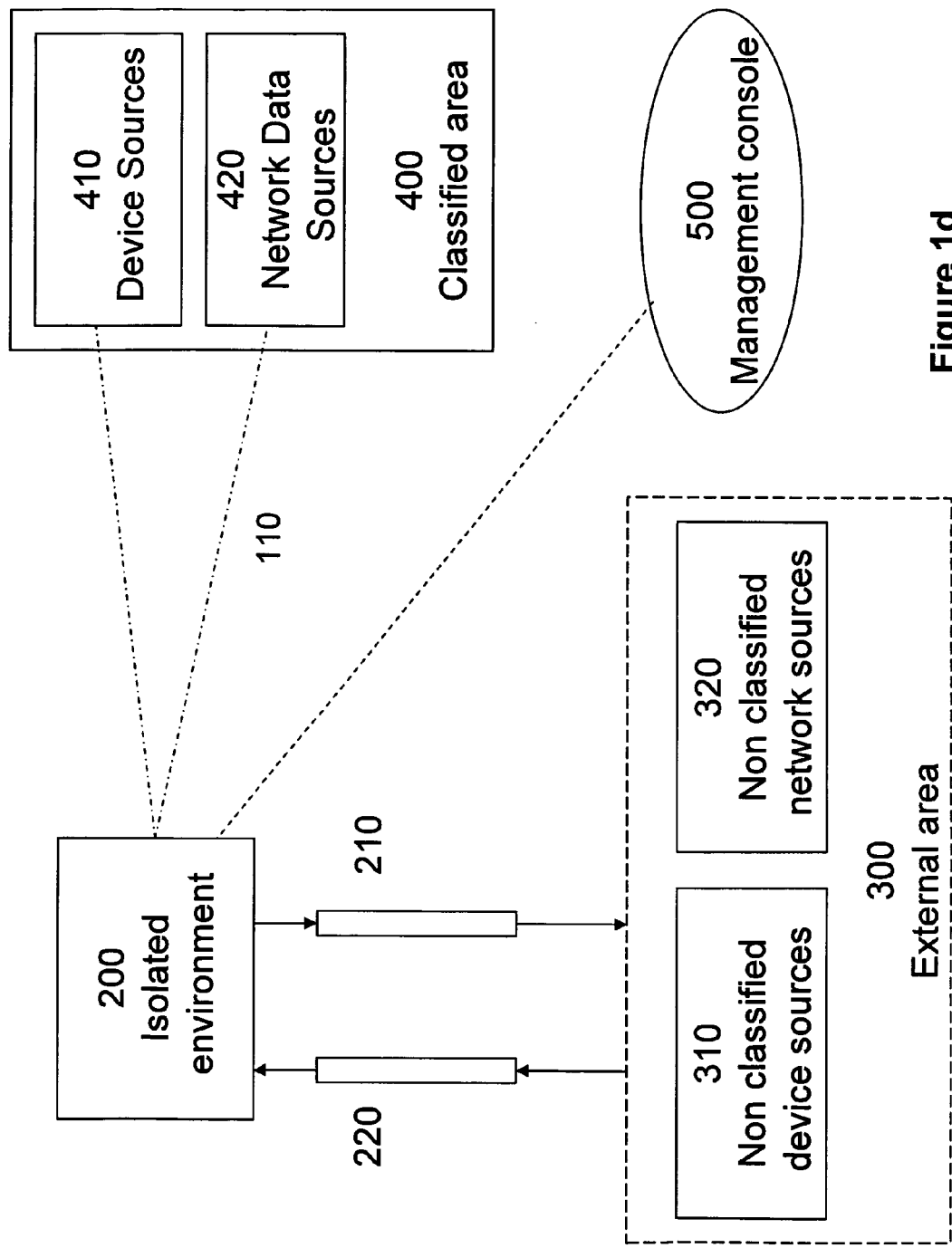
FIG. 1d is a simplified block diagram illustrating a fourth apparatus for securing data, according to a preferred embodiment of the present invention.

Reference is now made to FIG. 1d, which is a simplified block diagram illustrating a fourth apparatus for securing data, according to a preferred embodiment of the present invention.

An apparatus according to a preferred embodiment of the present invention includes an isolated processing environment 200. The isolated processing environment 200 is used as part of a user environment, runs applications, and processes data units, in an isolated manner.

That is to say, the isolated processing environment 200 is a secured and separated environment, in a way that by default no external entity has access to the application's data, network or running processes. The isolated processing environment 200 functions as a separated computing unit with predefined processing and storage resources.

The isolated processing environment 200 may be part of or have access to a classified area 400, as known in the art. The classified area 400 may include data sources such as device sources 410 (say database servers, computing devices—be the devices and servers external or internal to the endpoint computer).

Preferably, the isolated processing environment 200 includes an automatically encrypted local file system.

The automatically encrypted local file system may be used to automatically for encrypting a data unit when storing the data unit in the isolated processing environment 200, utilizing methods known in the art.

The classified area 400 may also include network data sources 420 accessible using unmanaged communication channels 110 to network entities (e.g. network segment, network address, domain, URL, intranet site, network path, local path, file share), or any combination thereof.

Unmanaged communication channels may be created between different entities in the classified area 400, using known in the art tools (say firewall rules, VPN, VLAN, mapped drives, resource management on a host, etc.).

Unmanaged communication channels 110 may also be created between entities in the classified area 400 and the isolated processing environment 200.

Optionally, the isolated processing environment 200 is located inside the classified area.

Optionally, the classified area is external to the isolated processing environment 200.

Preferably, a data unit (such as a file, an email, a message, clipboard content, and any other data unit) may leave the isolated processing environment 200 only if a policy predefined by a user or administrator of the apparatus allows the output of the data unit, as described in further detail hereinbelow.

Preferably, the output of data units from the isolated processing environment 200 is controlled by an output channel monitor 210, as described in further detail hereinbelow.

Preferably, the input of data units into the isolated processing environment 200 is controlled by an input channel monitor 220, as described in further detail hereinbelow.

The channel controllers 210, 220 monitor and control the moving of data units between the isolated processing environment 200 and entities in an area 300 external to the isolated processing environment 200 and the classified area 400, as described in further detail hereinbelow. For example, the channel controller 210,220 control the moving of data units between the isolated processing environment 200 and non-classified device sources 310 and non-classified network sources 320, as described in further detail hereinabove.

Preferably, an apparatus according to a preferred embodiment of the present invention also includes a management console 500 connected to the isolated processing environment.

The management console 500 is used for carrying out maintenance, changes to configuration and policies, define classification groups, manage audit and logs and manage encryption keys used to modify data units into an unreadable encrypted format, etc., as described in further detail hereinbelow.

Optionally, an apparatus according to a preferred embodiment of the present invention also includes an installation module. The installation module is used for installing, on an endpoint networked computer, the isolated processing environment 200, the output channel control 120, the input channel controller 130, etc.

Figure 1E:
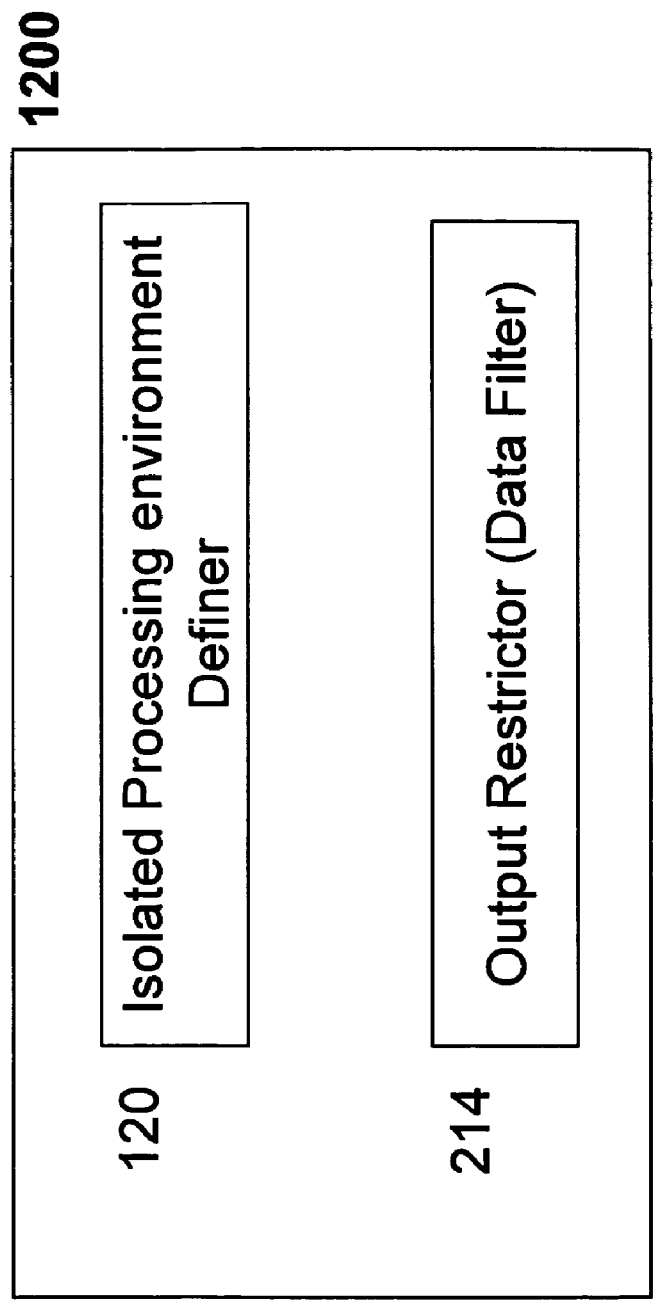
FIG. 1e is a simplified block diagram illustrating a kit for securing data, according to a preferred embodiment of the present invention.

Reference is now made to FIG. 1e, which is a simplified block diagram, illustrating a kit for securing data, according to a preferred embodiment of the present invention.

Kit 1200 for securing data comprises an isolated processing environment definer 120.

The isolated processing environment definer 120 is operable to define an isolated processing environment associated with a classified area of data sources. The isolated processing environment resides on an endpoint computer.

The classified area may include data sources including but not limited database servers, network devices, network connections, etc, as described in further detail hereinabove.

Kit 1200 also includes an output restrictor 214, say a data filter.

The output restrictor 214 is installable on the endpoint computer, and restricts outputting of the data unit from the isolated processing environment defined using the isolated processing environment definer 120, as described in further detail hereinbelow.

Figure 2:
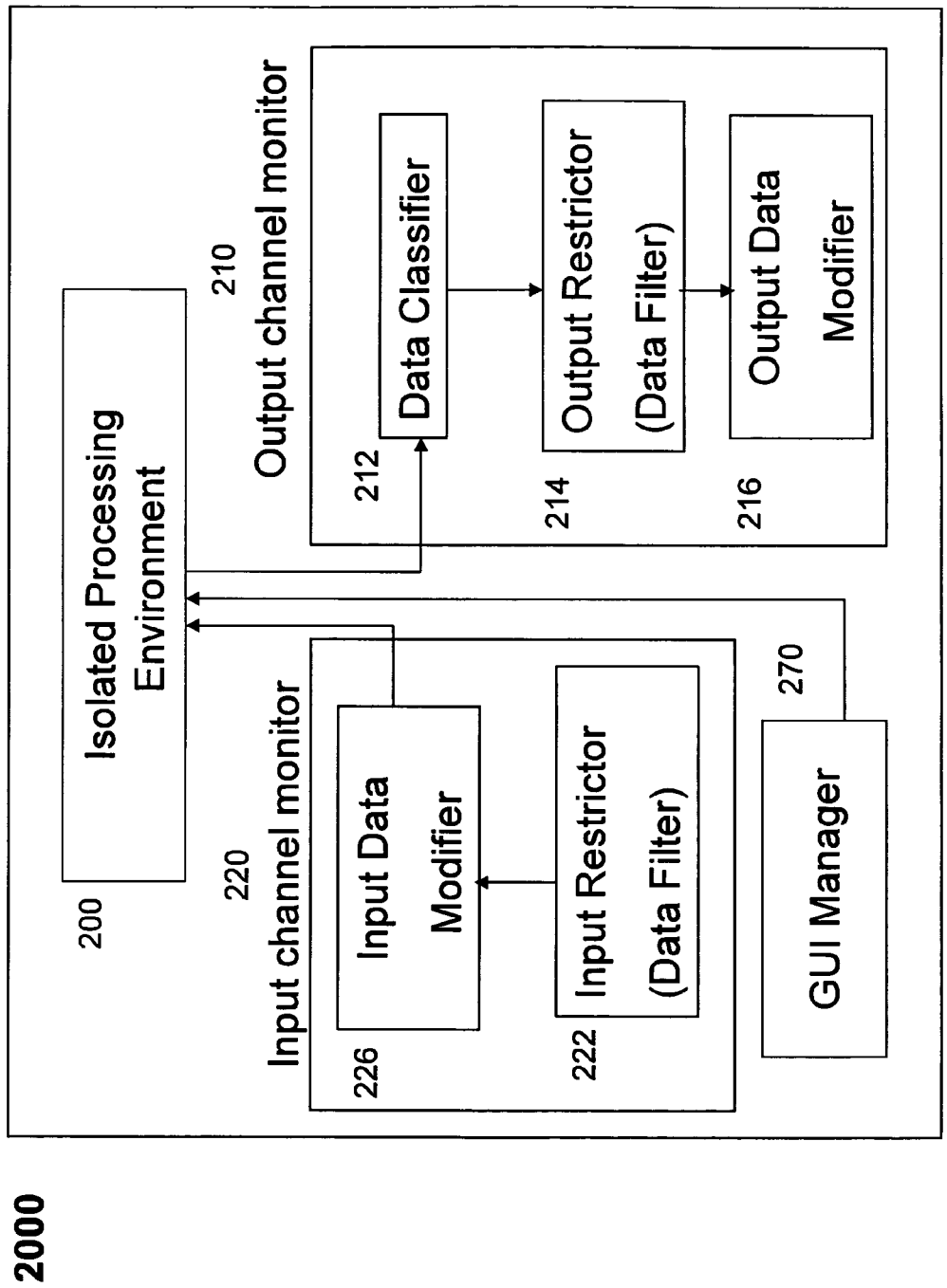
FIG. 2 is a simplified block diagram illustrating a fourth apparatus for securing data, according to a preferred embodiment of the present invention.

Reference is now made to FIG. 2, which is a simplified block diagram illustrating a fourth apparatus for securing data, according to a preferred embodiment of the present invention.

Apparatus 2000 includes an isolated processing environment 200, as described in further detail hereinabove.

Apparatus 2000 also includes an output channel monitor 210.

Preferably, the output channel monitor 210 operates from within the isolated processing environment 200, and monitors any attempt to output data units from the isolated processing environment 200 to locations that are not within the classified area. Optionally, the output channel monitor 210 also monitors any attempt to output a data unit from the classified area 400 described in further detail hereinabove.

Preferably, the output channel monitor 210 monitors any attempt to output data from the isolated processing environment 200, such as—writing to local files, sending to files servers, downloading to a portable memory device (such a USB portable memory, etc, as known in the art), composing an email, copy data to a clipboard, taking a screenshot, or sending data unit to printing.

The output channel monitor 210 includes a data classifier 212, connected to the isolated processing environment 200.

The data classifier 212 receives data units about to be output from the isolated processing environment 200.

The data classifier 212 classifies each of the received data units, according to a policy. Preferably, the policy is predefined by a user or an administrator of the apparatus 2000. For example, the data classifier 212 may assign the data unit a classification group selected amongst classification groups predefined by a user or administrator of the apparatus 2000, as described in further detail hereinbelow.

The output channel monitor 210 also includes an output restrictor 214, say a data filter. The output restrictor 214 is connected to the isolated processing environment 200 and the data classifier 212.

The output restrictor 214 restricts the outputting of the data unit from the isolated processing environment 200. Preferably, the output restrictor also restricts the outputting of a data unit from the classified area 400, as defined hereinabove.

The output restrictor 214 determines whether the outputting of the data unit is to be blocked, allowed, etc.

Preferably, the output restrictor 214 may also determine that an action to be performed prior to outputting the data unit, as described in further detail hereinbelow.

Preferably, the output restrictor 214 restricts the outputting of the data according to a pre-defined policy. The predefined policy may be based on the classification of the data unit, say according to the classification group assigned to the data unit by the data classifier 212.

Preferably, the output restrictor 214 is further configured to change classification of the output data unit, according to a predefined policy, as described in further detail hereinbelow.

The output channel monitor 210 also includes an output data modifier 216, connected to the isolated processing environment 200 and the output restrictor 212.

If the output restrictor 214 allows the outputting of the data unit, the output data modifier 216 modifies the data unit in accordance with a predefined policy. The policy may be defined in advance by a user or an operator of the apparatus 2000.

Preferably, the output data modifier 216 modifies the data unit in accordance with the classification group assigned to the data unit by the data classifier 212.

Preferably, by modifying the data unit, the output data modifier 216 converts the data unit into an unreadable format.

The modification of the data unit may include, but is not limited to encryption of the data unit using known in the art encryption techniques, thereby converting the data unit into an unreadable format.

Preferably, apparatus 2000 also include a Graphical User Interface (GUI) Manager 270, connected to the isolated processing environment 200.

The Graphical User Interface (GUI) Manager 270 manages a GUI, for presenting data units to a user of the endpoint computer.

Preferably, the Graphical User Interface (GUI) Manager 270 marks the presented data unit in accordance with a predefined policy. For example, the GUI manager 270 may present a data unit residing in the isolated processing environment 200 with a distinctive visual mark, say with a special icon, present a data unit output from the isolated processing environment 200 with a special marking in red, etc.

Apparatus 2000 also includes an input channel monitor 220.

Preferably, the input channel monitor 220 operates from within the isolated processing environment 200, and monitors any attempt to input data units into the isolated processing environment 200. Optionally, the input channel monitor 220 also monitors any attempt to input a data unit into the classified area 400 described in further detail hereinabove.

The input channel monitor 220 includes an input restrictor 222, connected to the isolated processing environment 200.

The input restrictor may be connected or associated with an environment selector 228. The environment selector 228 detects an attempt to perform an operation in data units residing on the computer, and determines if the operation has to be restricted to the isolated processing environment, as describe in further detail hereinabove.

The input restrictor 222 restricts the inputting of the data unit into the isolated processing environment 200. Preferably, the input restrictor 222 also restricts the inputting of a data unit into the classified area 400, as defined hereinabove.

The input restrictor 222 determines whether the inputting of the data unit is to be blocked, allowed, etc. Preferably, the input restrictor 222 may also determine that an action to be performed prior to inputting the data unit, as described in further detail hereinbelow.

For example, the input restrictor 222 may detect a user's attempt to access any data unit that is located out of the classified area 400 and determines the data unit's classification, say by determining the data unit's classification group, as described in further detail for the data classifier 212 hereinabove. Then, the input restrictor 222 determines if the data unit is to be allowed access from the isolated processing environment 200.

The input channel monitor 220 also includes an input data modifier 226, say a data filter. The input data modifier 226 is connected to the isolated processing environment 200 and the input restrictor 222.

If the input restrictor 222 allows the inputting of the data unit (say, by allowing access to the data unit from the isolated processing environment 200), the input data modifier 226 modifies the data unit in accordance with a predefined policy.

The policy may be defined in advance by a user or an operator of the apparatus 2000.

Preferably, the input data modifier 226 modifies the data unit in accordance with the data unit's classification, say according to a classification group assigned to the data unit by a data classifier 212 of another isolated processing environment the data unit originates from.

Preferably, by modifying the data unit, the input data modifier 226 recovers the readable format of the data unit converted into an unreadable format (say using an output data modifier 216 of another isolated processing environment, as described hereinabove).

The modification of the data unit may include, but is not limited to decryption of the data unit using known in the art decryption techniques, thereby converting the data unit into a readable format.

Figure 3:
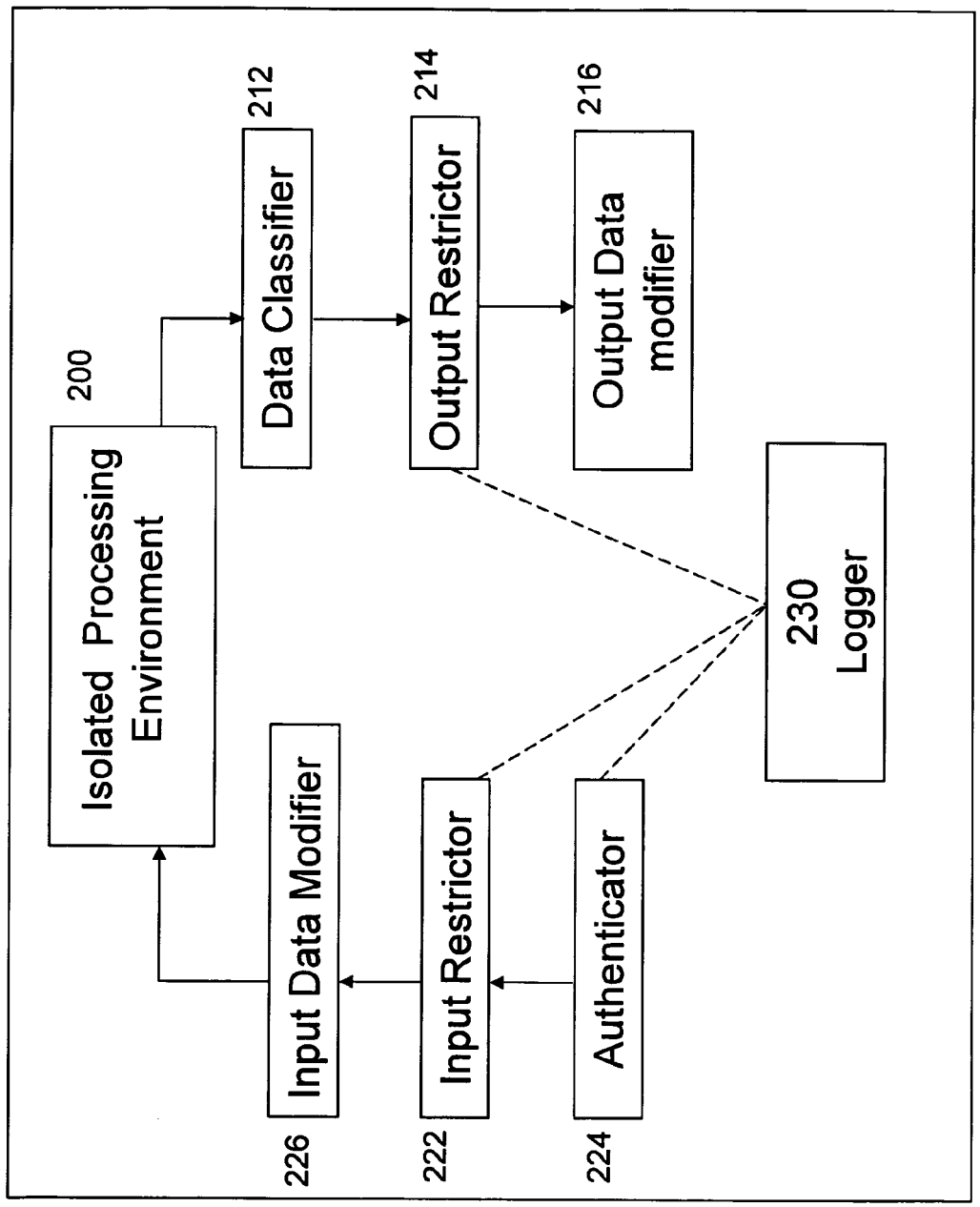
FIG. 3 is a simplified block diagram illustrating a fifth apparatus for securing data, according to a preferred embodiment of the present invention.

Reference is now made to FIG. 3, which is a simplified block diagram illustrating a fifth apparatus for securing data, according to a preferred embodiment of the present invention.

Apparatus 3000 includes an isolated processing environment 200, as described in further detail hereinabove.

Apparatus 3000 also includes a data classifier 212, connected to the isolated processing environment 200.

The data classifier 212 receives data unit about to be output from the isolated processing environment 200. The data classifier 212 classifies each of the received data units, according to a policy. Preferably, the policy is predefined by a user or an administrator of the apparatus 3000, as described in further detail hereinabove.

Apparatus 3000 also includes an output restrictor 214, (say a data filter, as known in the art) connected to the data classifier 212.

The output restrictor 214 restricts the outputting of the data unit from the isolated processing environment 200. Preferably, the output restrictor also restricts the outputting of a data unit from the classified area 400, as defined hereinabove.

The output restrictor 214 determines whether the outputting of the data unit is to be blocked, allowed. Preferably, the output restrictor 214 may also determine that a certain action has to be performed prior to outputting the data unit, as described in further detail hereinbelow.

Preferably, the output restrictor 214 restricts the outputting of the data according to a pre-defined policy. The predefined policy may be based on the classification of the data unit, say according to the classification group assigned to the data unit by the data classifier 212, as described in further detail hereinabove.

Apparatus 3000 also includes an output data modifier 216, connected to the output restrictor 212.

If the output restrictor 214 allows the outputting of the data unit, the output data modifier 216 modifies the data unit in accordance with a predefined policy. The policy may be defined in advance by a user or an operator of the apparatus 3000.

Preferably, the output data modifier 216 modifies the data unit in accordance with the classification group assigned to the data unit by the data classifier 212.

Preferably, by modifying the data unit, the output data modifier 216 converts the data unit into an unreadable format.

The modification of the data unit may include, but is not limited to encryption of the data unit using known in the art encryption techniques, thereby converting the data unit into an unreadable format.

Apparatus 3000 further includes an input restrictor 222 (say a data filter, as known in the art), connected to the isolated processing environment 200.

The input restrictor 222 restricts the inputting of the data unit into the isolated processing environment 200. Preferably, the input restrictor 222 also restricts the inputting of a data unit into the classified area 400, as described in further detail hereinabove.

The input restrictor 222 determines whether the inputting of the data unit is to be blocked, allowed, etc. Preferably, the input restrictor 222 may also determine that a certain action has to be performed prior to inputting the data unit, as described in further detail hereinbelow.

For example, the input restrictor 222 monitors user attempt to access any data unit that is located out of the classified area 400 and determines the data unit's classification, say by determining the data unit's classification group, as described in further detail for the data classifier 212 hereinabove. Then, the input restrictor 222 determines if the data unit is to be allowed access from the isolated processing environment 200.

The apparatus 3000 also includes an input data modifier 226, connected to the input restrictor 222.

If the input restrictor 222 allows the inputting of the data unit (say, by allowing access to the data unit from the isolated processing environment 200), the input data modifier 226 modifies the data unit in accordance with a predefined policy.

The policy may be defined in advance by a user or an operator of the apparatus 3000.

Preferably, the input data modifier 226 modifies the data unit in accordance with the data unit's classification, say according to a classification group assigned to the data unit by a data classifier 212 of another isolated processing environment the data unit originates from.

Preferably, by modifying the data unit, the input data modifier 226 recovers the readable format of the data unit converted into an unreadable format (say using an output data modifier 216 of another isolated processing environment, as described hereinabove).

The modification of the data unit may include, but is not limited to decryption of the data unit using known in the art decryption techniques, thereby converting the data unit into a readable format.

Apparatus 3000 may also include an authenticator 224 connected to the input restrictor.

The authenticator 224 authenticates a user's identity before allowing the user to access the data unit. The authenticator 224 may utilize any of known in the art user authentication methods including, but not limited to: shared secret, password, certificate based, challenge-response, token authentication, biometric systems or other physical devices, etc.

Apparatus 3000 also includes a logger 230, connected to the input restrictor 222 and the output restrictor 214.

The logger 230 logs operations allowed or blocked by the restrictors 214,222, by recording information pertaining to the operations in logs.

Optionally, the logger 230 is also connected to the authenticator 224, and further logs operations performed by the authenticator 224.

The logs may be used to audit and analyze the recorded operations various ways, as known in the art. The ways may include, but are not limited to: filtering, aggregation into log servers, generation of alerts via any messaging channel, categorization into various importance levels, searching, indexing, or generating statistics.

Figure 4:
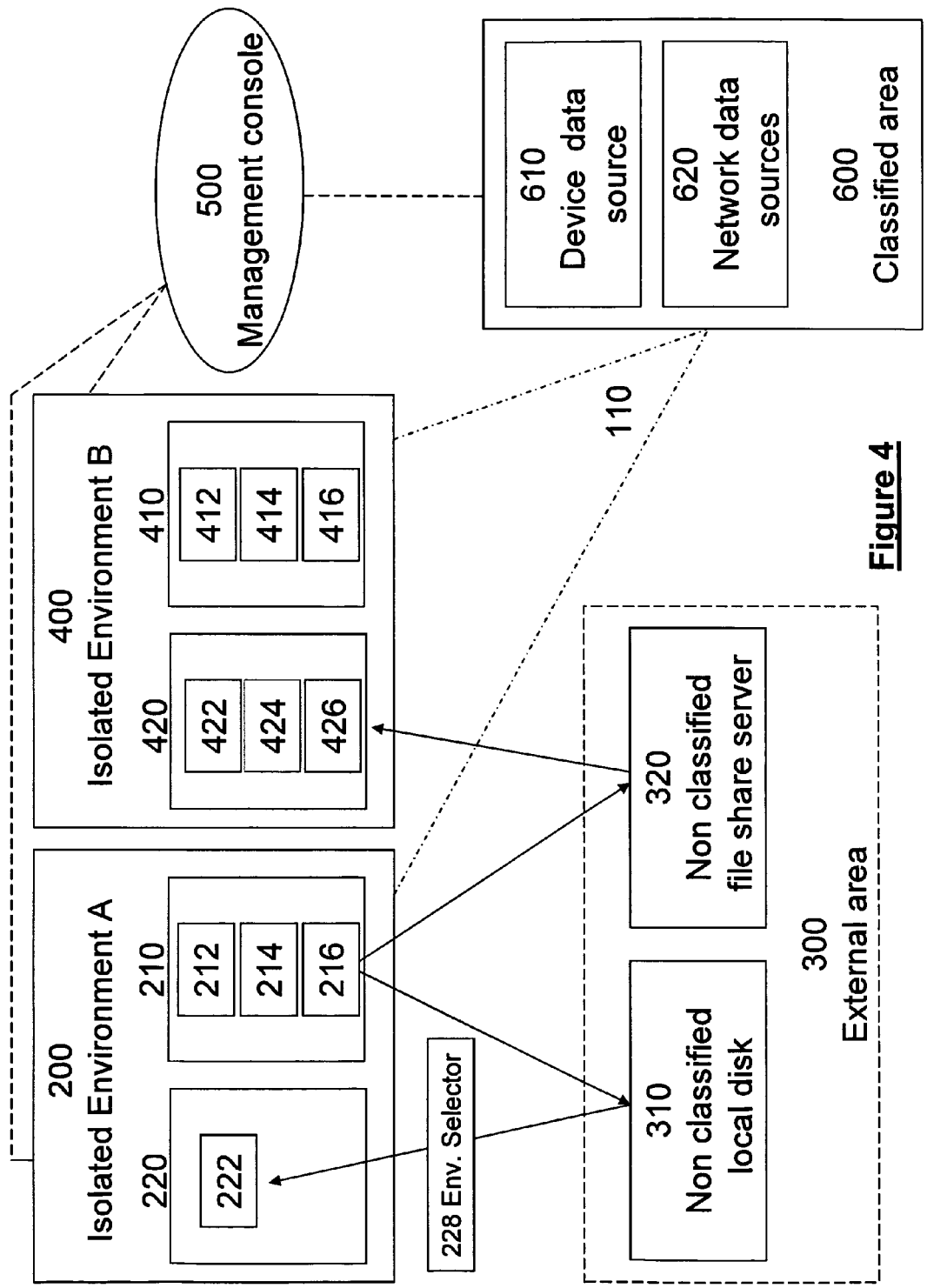
FIG. 4 is a block diagram illustrating an exemplary implementation of a first system for securing data, according to a preferred embodiment of the present invention.

Reference is now made to FIG. 4, which is a block diagram illustrating exemplary implementation of a first system for securing data, according to a preferred embodiment of the present invention.

An exemplary system according to a preferred embodiment of the present invention includes a classified area 600.

The classified area 600 includes device data sources 610 (say a database server, a storage device, etc.), as well as network data sources 620 (say a connection to a local network, an intranet network, etc, as known in the art).

The classified area 600 includes several network segments 620 that contain only classified data. This classified area 600 includes some file servers, database, internal web servers, etc.

The classified area 600 is accessible only from predefined isolated processing environments, as described in further detail hereinbelow.

Optionally, parts of the classified area are managed by known network control methods such as firewall, VLANs, assuring that classified data does not leak from the classified area, as known in the art Entities that do not contain classified information prior to the implementation of the exemplary system, such as a mail server, file servers, USB drives, etc., are excluded from the classified area 600, and form an external area 300.

In the present example, all entities that are part of the classified area 600, and all the data units residing on the entities of the classified area 600 are assigned a classification group A.

Optionally, a few isolated processing environments 200, 400 are created using a virtual machine within a host computer and additional isolated processing environments are created by running a remote desktop on a physically separated machine, as known in the art.

The creation of the isolated processing environments may be carried out using current tools, including but not limited to virtual machine tools—such as VMWare™, Microsoft Virtual PC™, and remote desktop tools such as Citrix™ or Microsoft Terminal Services™.

Communication channels 110 are established between the isolated processing environments 200, 400 and data sources of the classified area 600.

Security policies regarding the incoming and outgoing data units to and out of the isolated processing environment 200 A, which is assigned the classification group A are defined. For example, one security policy forbids writing to portable memory devices (such as disk-on-key, floppy and CDs). However, printing and sending documents via Email are allowed after receiving an administrator's permission.

The exemplary system also includes a management console 500, connected to the isolated processing environments 200, 400. The management console 500 may also be connected to the classified area 600.

The management console 500 may be used by an administrator of the system, to define and assign classification groups, to manage the isolated processing environments 200, to define and manage the classified area 600 and the classified area's content, to define policies, etc.

In the example, isolated processing environment A 200, is created using VMWare™.

The environment 200 is then used by user A to create a new file. When attempting to save the file to a local disk 310 deployed out of the classified area 600, the operation is detected by an output channel monitor 210, as described in further detail hereinabove.

Within the output channel monitor 210, the data units of the file are first forwarded to the data classifier 212, which assigns each of the data units of the file a default classification group defined for the isolated processing environment 200. The default classification group defined for the isolated processing environment A 200 is classification group A.

The data unit is then forwarded to the output restrictor 214.

The output restrictor 214 determines if the operation is allowed. The determination may be carried out according to the determined classification group of the data unit and a security policy predefined by the administrator of the system using the management consol 500.

According to the administrator's predefined security policy used for the present example, an attempt to write a data unit to the local disk is allowed.

Upon authorization of the operation (i.e write the data unit to the local disk), the data unit is allocated to the output data modifier 216, which modifies the data unit.

By modifying the data unit, the data modifier 216 converts the data unit into an unreadable format chosen in accordance with the classification group assigned to the data unit and the securing policy defined by the administrator of the system.

In the present example, the data unit is converted into an unreadable format using encryption with an encryption key defined as a unique key for the classification group.

In the example, all users authorized to access data units assigned the classification group A are granted access to the decryption key usable for decrypting the encrypted data units assigned the classification group A.

For example, a user whose identity is authenticated may be provided with the decryption key, as described in further detail hereinbelow. After the identity of a user is authenticated, the user may be sent the decryption key from the management console 500.

The required action is then executed, and the data unit (that is the file) is saved on the unclassified local disk 310 in the encrypted format.

The system further includes an environment selector 228, deployed out of the isolated processing environments 200, and connected to the isolated processing environment 200.

The environment selector 228 residing outside the isolated processing environment 200 detects an attempt to access the unreadable file.

The environment selector 228 determines the classification group of the file, and activates relevant authentication and authorization process to permit the user's access to the file.

The data units are transferred for further processing in the isolated processing environment the data units in the file originate from, namely, isolated processing environment A 200.

Furthermore, in this example, a user may choose to output a data unit (say a file) from the isolated processing environment 200, by attempting to save the data unit in a shared file location 320 (say a shared folder, a file server, or even a portable memory drive) located out of the classified area 600.

The attempt is detected by the outgoing channel monitor 210.

The data units are assigned classification group A, by the output data classifier 212.

The output restrictor 214 allows the outputting of the data unit, and the output data modifier 216 modifies the data unit into an encrypted format, as described in further detail hereinabove.

Finally, the data unit is saved in the non-classified shared file location 320, in an encrypted format.

An isolated processing environment B 400, created by remote desktop on a stand-alone server, and also assigned classification group A, is used by user B.

User B has access privileges to the shared file location 320 (physically or over the network). However, file location 320 is not defined as part of the classified area 600 to which isolated processing environment B 400 is related.

When user B attempts to access the file on the shared file location 320, from within the isolated processing environment B 400, the operation is detected by an input restrictor 426 associated with isolated processing environment B 400, as described in further detail hereinabove.

The input restrictor 426 determines the classification group of the data unit, and allows the inputting of the data unit into the isolated processing environment 400.

Then, User B's identity is authenticated using a relevant authentication procedure carried out by an authenticator 424, as described in further detail hereinabove. For example, User B's Identity may be authenticated by a biometric system 424, as known in the art.

Next, the file is transferred for further processing in the relevant isolated processing environment—isolated processing environment B 400.

Then, the data unit is modified by an input data modifier 422 connected to the isolated processing environment 400.

The input data modifier 422 obtains the key from the central management console 500, and uses the key to decrypt the data unit, thus restoring the data unit into a readable format.

By restoring the data unit into a readable format, the input data modifier enables the processing of the data unit by the user and the relevant applications executed for the user.

That is to say, after the data unit is restored to a readable format, the authorized user B may process the data unit in the isolated processing environment 400.

Thus in the example provided above, although the data unit is transported over unclassified systems, in the external area 300, only authorized users are able to access the data unit, provided the users access the data unit in the relevant isolated processing environment 400.

Figure 5:
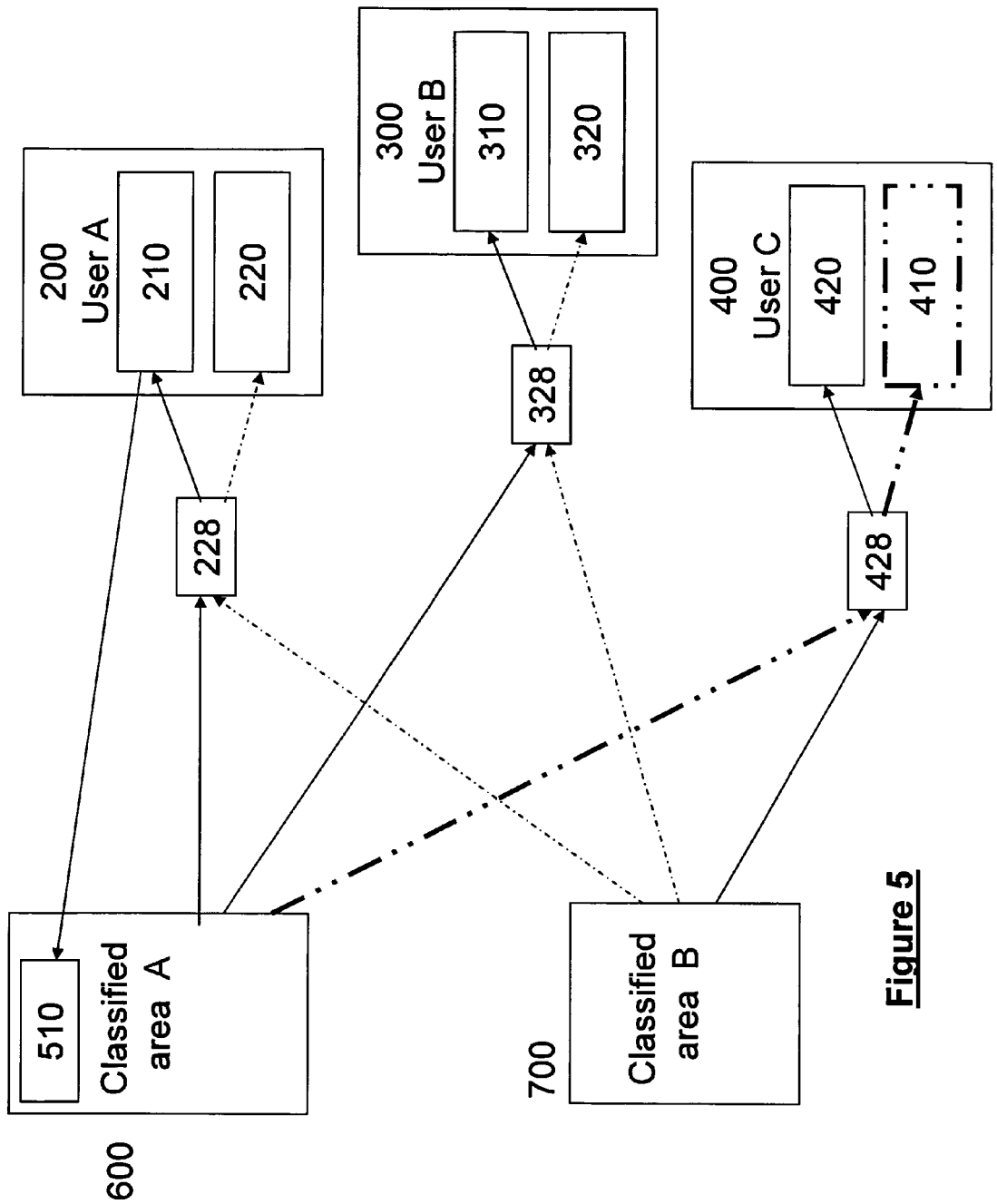
FIG. 5 is a block diagram illustrating an exemplary implementation of a second system for securing data, according to a preferred embodiment of the present invention.

Reference is now made to FIG. 5, which is a block diagram illustrating an exemplary implementation of a second system for securing data, according to a preferred embodiment of the present invention.

The illustration provided by using FIG. 5 is based on an exemplary system according to a preferred embodiment of the present invention.

The system of FIG. 5 comprises two classified area 500, 600.

A classification group A is assigned to any data unit originating from classification area 500, and classification group B is assigned to any data unit originating from classification area 600

Preferably, the two classified areas 600 and 700 are mutually exclusive in terms of data sources that are part of the classified area(s), or accessible from within the classified area(s). Each data source (say a device, a database, a network connection, etc) uniquely belongs to a single one of the classified areas.

In the example, a security policy for classification group A forbids writing of data units of classification group A to removable media (such as portable memory devices, thumb disks, floppy and CDs) and copying the data to a clipboard out of the an isolated processing environment which has access to classification group A.

Further, a security policy for classification group B also forbids writing to removable media, but also requires the administrator's approval for printing or attaching data units to mail messages.

Each user is assigned permissions to access one or both of the classification groups.

In the example, users A 200 and B 300 are assigned permissions to read and write data units of both classification groups A and B, but user C 400 is only assigned permissions to read and write data units of classification group B.

A security policy applicable to both classification groups defines that if a user does not have permissions to access a certain data unit, he may still be allowed access to the data units by the administrator.

In the present example, each isolated processing environment is allowed access to one or more classification groups.

Security policies regarding the incoming and outgoing data units to and out of isolated processing environments are defined by an administrator of the system, say using a management console 500, as described in further detail hereinabove.

Two isolated processing environments 210, 220 are created on top of user A's host 200 using virtual machines (such as VMWare™ or Microsoft virtual PC™).

Isolated processing environments 210 is connected to, and has access privileges to classified area A 500, as the data units of classified area A are assigned the classification group A.

Isolated processing environments 220 is connected to, and has access privileges to classified area B 700, as the data units of classified area B are assigned the classification group B.

User A may choose to create a new file within the isolated processing environment A 210, from a data originating from the classified area 600 that isolated processing environment A 210 has access to.

Once the file is created using the environment 210, all processing of the file is carried out in the isolated processing environment 210 (or by any other environment that has permission to access classified areas of classification group A), as described in further detail hereinabove.

User A then chooses to attach the file to an email, addressed to User B 300 and User C 400 via a mail server excluded from the classified area 600.

When User A 200 attempts to send the file as an attachment to an e-mail message, the operation is detected by an output channel monitor of the isolated processing environment 210, as described in further detail hereinabove.

The data file is first allocated to an output data classifier, as described in further detail hereinabove. The output data classifier assigns the default classification group defined for the isolated processing environment 210 (i.e. classification group A) to the file.

Then, the file is forwarded to an output restrictor, as described in further detail hereinabove.

The output restrictor uses the data unit's classification group to determine if the operation is to be allowed, in accordance with a security policy predefined by the administrator of the system.

According to the predefined security policy, writing a data unit to an Email is allowed. Consequently, the outputting of the file from the isolated processing environment 210 used by user A is allowed.

Upon authorization of the operation, the file is forwarded to an output data modifier, as defined hereinabove.

The output data modifier modifies the file, according to a predefined policy, based on the classification group assigned to the file.

For example, the modification may be carried out by copying the file to a central server 510 or a shared file location that is a part of the classified area and is capable of restricting the access of users to the file. The attachment of file to the email message is replaced with a link or a reference to the file on the central server 510.

The link may be implemented using known in the art methods, such as standard linking methods that exist in some Operating Systems, or by a special file type within the system.

Then, the email message is sent via the unclassified mail server, say an encrypted format.

Then, the email message is received by users B 300 and C 400.

User B 300 also uses two isolated processing environments 310 and 320 created by a virtual machine on top of his host.

Isolated processing environments 310 is connected to, and has access privileges to classified area A 500, as the data units of classified area A are assigned the classification group A.

Isolated processing environments 320 is connected to, and has access privileges to classified area B 700, as the data units of classified area B are assigned the classification group B.

When a user attempts to access the email message, the operation is detected by an environment selector 328 residing outside the isolated processing environments, as described in further detail hereinabove. In the provided example, email are considered unclassified and the email message body is processed outside the isolated processing environments.

The environment selector 328 determines the classification group of the file link in the email message, namely classification group A.

In accordance with a predefined policy pertaining to classification group A, the environment selector 328 determines that the file link has to be forwarded to isolated processing A 310, and the email message with the file link is forwarded to isolated processing environment A 310.

Next, the file is processed by a data restorer in isolated processing environment A 310, which authenticates the user against the central server 510 and obtains the content of the file from the central server 510, thus enabling the processing of the file by the user and the relevant applications used by the user in the isolated processing environment A 310.

When a user attempts to use clipboard operations to copy a data from within isolated processing environment A 310, or from environment A 310 to another isolated processing environment (say isolated processing environment B 320), the operation is detected by an output channel monitor, as described in further detail hereinabove.

Within the output channel monitor, the data is first received by the output data classifier. The output data classifier assigns classification group A to the data unit, in accordance with a predefined policy, as described in further detail hereinabove.

Next, the data is allocated to an output restrictor, which uses a predetermined security policy pertaining to classification group A, for determining if the clipboard operation is allowable.

According to the predefined security policy pertaining to classification group A, copying clipboard data of classification group A out of the isolated processing environment 310 is forbidden. The operation is therefore blocked, and the attempt is audited by a logger, as described in further detail hereinabove.

As described hereinabove, user C 400 is granted permissions to access classification group B alone and therefore has one isolated processing environment 420 on top of his host, created by a virtual machine and associated with classification group B.

When User C 400 attempts to access an email message carrying a data unit (say an attached file) originating from classified area A 600, the operation is detected by an environment selector 428 residing outside the isolated processing environments.

The environment selector 428 determines that the classification group of the data unit is A. As User C does not have access privileges to data units of classification group A, his access to the attached data unit is blocked.

The attempt is logged and sent via a management console to the administrator's queue for authorization.

Upon the administrator's authorization, user C 400 receives permissions to access the attached data unit. An additional isolated processing environment 410 associated with classification group A is created ad-hock to enable user C to view the file. In the present example, environment 410 is created using a remote desktop tool (e.g. Microsoft Terminal Services™).

Optionally, the data unit is modified by an input data modifier of the isolated processing environment 410, say for decrypting the data unit, as described in further detail hereinabove.

However, when User C attempts to output to the data unit, via the ad-hock environment 410, the output classifier of ad-hock environment 410 assigns the classification group A to the output data unit. Consequently, an output restrictor of ad-hock environment 410 blocks the operation, as user C 400 has no permissions to output classification group A data units.

Figure 6:
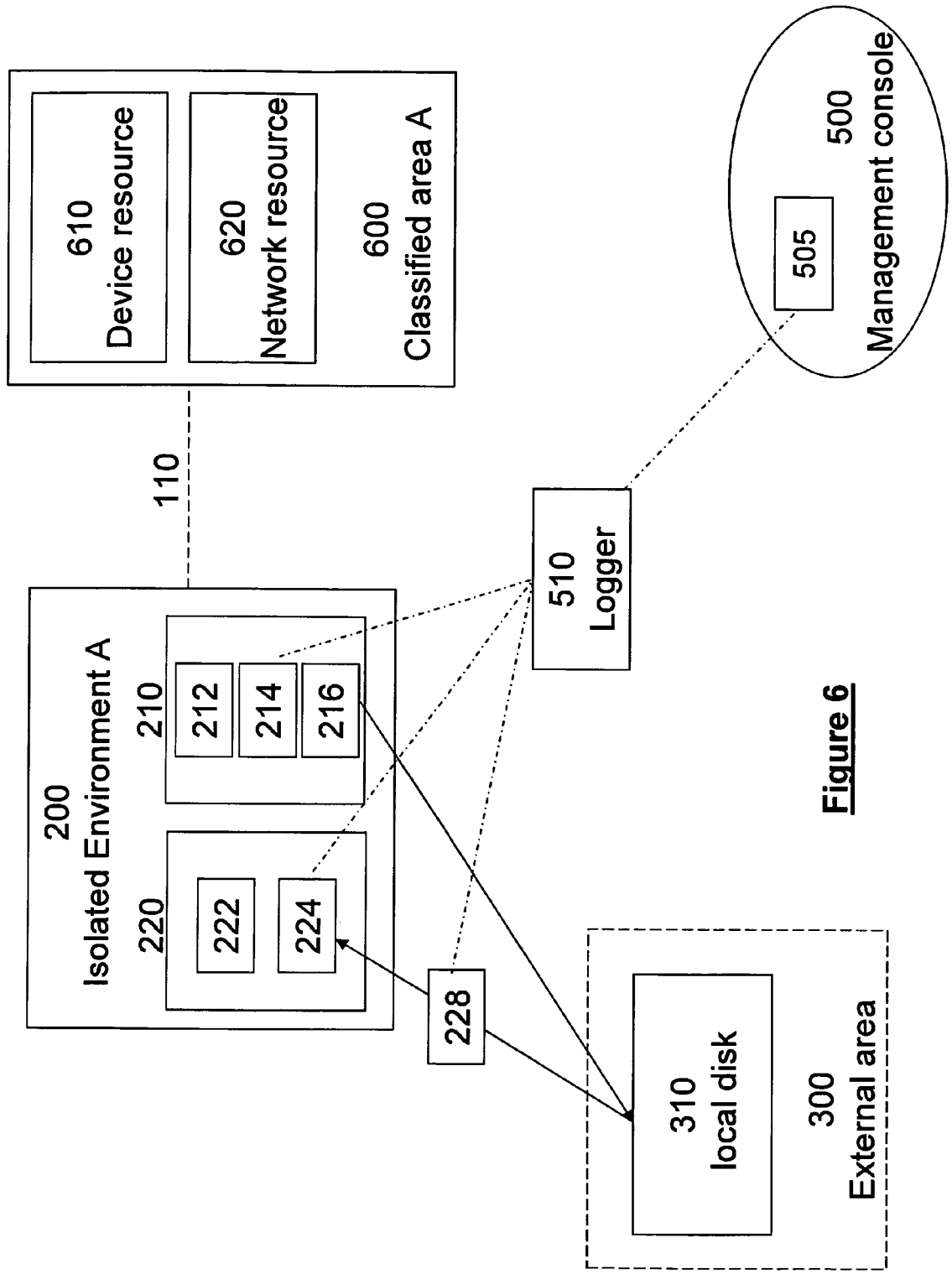
FIG. 6 is a block diagram illustrating an exemplary implementation of a third system for securing data, according to a preferred embodiment of the present invention.

Reference is now made to FIG. 6, which is a block diagram illustrating an exemplary implementation of a third system for securing data, according to a preferred embodiment of the present invention.

The system of FIG. 6 includes a classified area 600, and several isolated processing environments, as illustrated using FIG. 4 hereinabove.

The exemplary implementation of FIG. 6 uses the security polices of the exemplary implementation of FIG. 5 and an additional security policy.

According to the additional security policy of the present exemplary implementation, all users have permissions to assign unclassified data units to a classification group, and certain users also have permission to change the assigned classification group of a data unit, provided the change is approved by an administrator.

For example, User A has permissions to change classification group of data units from classification group A to unclassified.

The system of the exemplary implementation illustrated using FIG. 6 further includes a logger 510 residing on a user's endpoint computer.

The logger 510 logs all read and write operations of data units out of the isolated processing environments 200, the assigning of classification groups to data units, and the process of authenticating user's identity into predefined logs. The logs may be displayed to the administrator via a central management console 500, say for auditing purposes.

In the provided example, User A is a mobile user who uses a laptop as a host.

In the provided example, an isolated processing environment 200 is created on top of user A's host using sandbox technology as known in the art.

The sandbox technologies may include any method for buffering between a set of processes and the operating system, and controlling every operation that the process attempts to perform, thus enabling the creation of an isolated-processing environment.

In the provide example, User A has permissions to read and write data units in classification group A.

In the example, User A receives a file via email from a partner outside the organization, and the file is determined to be unclassified.

User A may want to process the file while having access to data sources that are assigned to classification group A and are accessible only via isolated processing environment A 200.

User A manually assigns the file to classification group A. The action is audited by the logger 510, which resides on User A's laptop.

If user A later attempts to assign the file to a different classification group, or to send the file back, outside the organization, User A is blocked by default, by the isolated processing environment 200's output restrictor, and User A needs an administrator's approval. User A's request is sent to the administrator's queue, and is logged by the logger 510.

Upon an attempt to save the file to a local disk 310, the operation is detected by the output channel monitor 210 connected to the isolated processing environment 200.

The data unit is then assigned with the default classification group associated with the isolated processing environment 200 (classification group A), say by an output data classifier 212, as described in further detail hereinabove.

Next, an output restrictor 214 allows the operation according to the above policy.

Then, the data unit is modified by a data modifier 216, which modifies the data unit by encryption, using an encryption key that is unique for the data unit. The decryption key is then cached and saved on user A's mobile host for later offline use. The decryption key is protected with user A's password.

When the remote User A's laptop is offline, User A continues to write and read data units. The logger 510 continues to log every operation.

When User A re-connects to the network, the logger 510 automatically synchronizes with a central audit manager 505 in the central management console 500, thus enabling the administrator to review user A's offline operations.

When User A wishes to access the file saved on the local disk 310, the operation is detected by the environment selector 228. The classification group of the data unit is then determined, and results in activating the relevant authentication and authorization process to permit access to the file, (say by asking user A to enter his password), say using an authenticator, as described in further detail hereinabove.

Upon confirmation of user A's identity, the data unit is allocated to further processing in the isolated processing environment 200 associated with classification group A. An input data modifier 222 uses the cached decryption key to decrypt the data unit, and user A is allowed to access the data unit via isolated processing environment A 200.

Figure 7A:
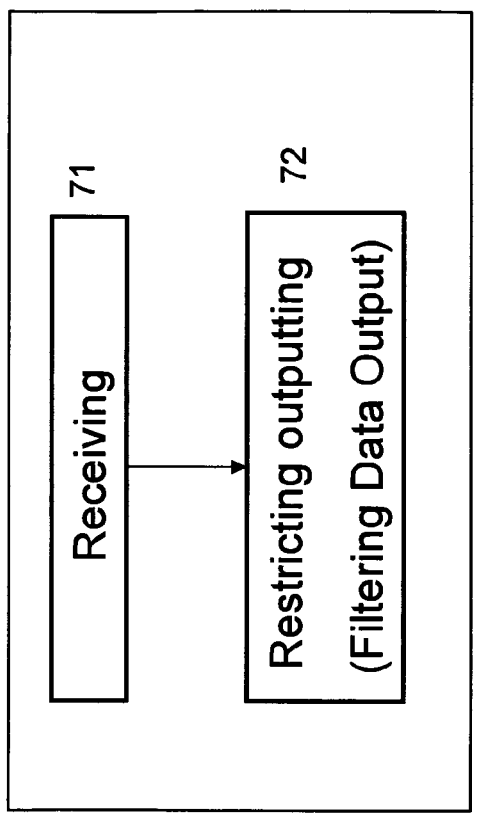
FIG. 7a is a simplified flowchart illustrating a first method for securing data, according to a preferred embodiment of the present invention.

Reference is now made to FIG. 7a, which is a simplified flowchart illustrating a first method for securing data, according to a preferred embodiment of the present invention.

In a method according to a preferred embodiment of the present invention, implemented in an isolated processing environment 200 (described in further detail hereinabove), a data unit is received 71 from a predefined classified area 400 connected to the isolated processing environment 200.

The classified area is a predefined area which includes one or more data sources that hold data units. The classified area 400 may be implemented using any of methods known in the art. The classified area 400 may include databases, servers, network connections, etc, as described in further detail hereinabove.

Then, an attempt to output the received data unit from the isolated processing environment 200 is restricted 72, in accordance with a predefined policy, say using an output restrictor 214, as described in further detail hereinabove.

Figure 7B:
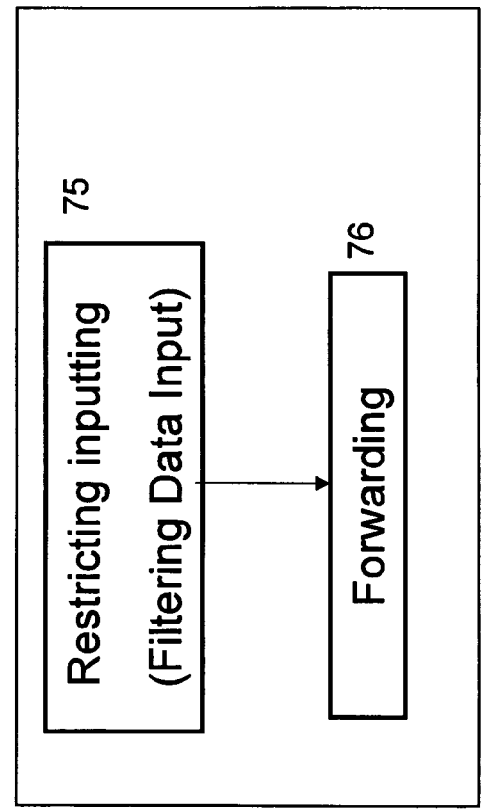
FIG. 7b is a simplified flowchart illustrating a second method for securing data, according to a preferred embodiment of the present invention.

Reference is now made to FIG. 7b, which is a simplified flowchart illustrating a second method for securing data, according to a preferred embodiment of the present invention.

In a method according to a preferred embodiment of the present invention, implemented in an isolated processing environment 200 (described in further detail hereinabove), the imputing data units into the isolated processing environment 200 is restrict 75, according to a predefined policy, say using an input restrictor 222, as described in further detail hereinabove.

That is to say, the inputting of the data unit may be blocked, allowed, etc. For example, the input restrictor 222 may allow access to the data unit from the isolated processing environment 2000, as described in further detail hereinbelow.

Optionally, there may also be determined if a certain action has to be performed prior to inputting the data unit, as described in further detail hereinabove.

Once the data unit is allowed access from the isolated processing environment, the data unit may be forwarded 76 to the classified area 400. For example, a user may choose to store the data unit in a database in the classified area 400, provided the user is an authorized user of the isolated processing environment 200.

It is expected that during the life of this patent many relevant devices and systems will be developed and the scope of the terms herein, particularly of the terms "endpoint computer", "network", "data unit", "file", "email", "virtual machine", "encryption" and "decryption", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for securing data comprising:
   a computing device having stored thereon instructions that upon execution cause:
   a secure environment definer to be configured to define a secure environment within an existing user environment, said definer configured to define a boundary about said environment across which data cannot pass and a channel out of said secure environment, the secure environment definer further being configured to define a filter associated with said channel out of said secure environment, said filter being definable to control passage of data out of said secure environment; and
   an environment selector configured to detect an attempt to perform an operation on a data unit, to classify a type of the data unit, and to select a selected processing environment among a plurality of processing environments that includes the secure environment based on the classification, and to restrict the performance of the operation to the selected processing environment according to a predefined policy.

2. The secure environment definer of claim 1, further for use with a predefined classified data area, and configured to ensure that data from said predefined classified area can only go to said secure environment.

3. The apparatus of claim 1, further comprising a data classifier, associated with said filter and configured to classify an output data unit according to a predefined policy, wherein said filter is further configured to restrict the outputting of the data unit according to the classification.

4. The apparatus of claim 1, further comprising an output data modifier, associated with said filter and configured to modify the output data unit according to a predefined policy.

5. The apparatus of claim 4, wherein said output data modifier is further configured to use the classification of the output data unit for the modifying.

6. The apparatus of claim 4, wherein said modifying comprises encrypting the output data unit.

7. The apparatus of claim 1, wherein said filter comprises an input filter and an output filter, said input filter being configured to restrict inputting of a data unit into said secure environment, wherein said secure environment is further operable to forward the input data unit to the classified area.

8. The apparatus of claim 7, further comprising an input data modifier associated with said input filter and configured to modify the input data unit according to a predefined policy.

9. The apparatus of claim 8, wherein said modifying comprises decrypting the input data unit.

10. The apparatus of claim 1, further comprising an authenticator, associated with said filter and configured to authenticate identity of a user attempting to access the output data unit and restrict access to the output data unit according to the authenticated identity.

11. The apparatus of claim 1, further comprising an authenticator, associated with said filter and configured to authenticate identity of a user attempting to access said secure environment and restrict access of the user to said secure environment according to the authenticated identity.

12. The apparatus of claim 1, further comprising a logger, associated with said secure environment and configured to log activity in said secure environment.

13. The apparatus of claim 1, wherein said secure environment comprises an automatically encrypted local file system, configured to automatically encrypt a data unit stored in said secure environment.

14. The apparatus of claim 1, further comprising a graphical user interface (GUI) manager, associated with said secure environment and configured to manage a GUI, for presenting a data unit to a user of an endpoint computer, with a distinctive visual mark, in accordance with a predefined policy.

15. The apparatus of claim 1, wherein said secure environment is allowed access to at least one classified area, in accordance with a predefined policy pertaining to classification group of the classified area.

16. Apparatus for securing data, comprising:
an isolated processing environment, associated with a predefined classified area of data sources, having a boundary across which data cannot pass and a channel for passage of data across said boundary, the isolated processing environment being operable to receive a data unit from the classified area, wherein said isolated processing environment is installed on an endpoint computer;
a data classifier, associated with said isolated processing environment, and configured to classify the data unit, according to a predefined policy, and to select a selected processing environment among a plurality of processing environments that includes the secure environment based on the classification, and to restrict the performance of the operation to the selected processing environment;
an output restrictor, associated with said channel and configured to restrict the outputting of the data unit across said channel, according to said classification; and
an output data modifier associated with said output restrictor and configured to modify the output data unit, according to said classification.

17. Apparatus for securing data, comprising:
an isolated processing environment, associated with a predefined classified area of data sources, wherein said isolated processing environment is installed on an endpoint computer, said isolated processing environment comprising a boundary across which data cannot pass and a channel for allowing data to pass across said boundary;
a data classifier, associated with said isolated processing environment, and configured to classify the data unit, according to a predefined policy, and to select a selected processing environment among a plurality of processing environments that includes the secure environment based on the classification, and to restrict the performance of the operation to the selected processing environment;
an input restrictor, associated with said channel, and configured to restrict input of a data unit into said isolated processing environment; and
an input data modifier, associated with said input restrictor and configured to modify said input data unit according to a predefined policy; and wherein said isolated processing environment is further operable to forward the input data unit to the classified area.

18. Apparatus according to claim 17, further comprising:
a data classifier, associated with said isolated processing environment, and configured to classify the data unit, according to a predefined policy;
an output restrictor, associated with said channel and configured to restrict the outputting of the data unit, according to said classification; and
an output data modifier associated with said output restrictor and configured to modify the output data unit, according to said classification.

19. System for securing data, comprising:
a first and a second isolated processing environments, each environment comprising a boundary across which data cannot pass and a channel through which data may cross said boundary, each environment operatively associated with a respective predefined classified area of data sources thereby to receive a data unit from the classified area, and installed on an endpoint computer, the first and second isolated processing environments each being configured to perform the operation on data having of a same type;
a data classifier, associated with said first and second processing environments, and configured to classify the data unit, according to a predefined policy, and to select a selected processing environment from the first and second processing environments that includes the secure environment based on the classification, and to restrict the performance of the operation to the selected processing environment; and
at least two output restrictors, each output restrictor associated with a channel of a respective one of said isolating processing environments and configured to control outputting of the received data unit from the isolated processing environment.

20. A computer program on a computer readable medium, for providing when run on a computer:
- an isolated processing environment definer, operable to define an isolated processing environment comprising a boundary across which data may not pass and a channel through which data may cross said boundary, the environment being associatable with a predefined classified area of data sources on an endpoint computer;
- a data classifier, associated with said isolated processing environment, and configured to classify the data unit, according to a predefined policy, and to select a selected processing environment among a plurality of processing environments that includes the secure environment based on the classification, and to restrict the performance of the operation to the selected processing environment;
- an output restrictor, installable on the endpoint computer, and configured to restrict outputting of the data unit through said channel; and
- an output data modifier associated with said output restrictor and configured to modify the output data unit.

21. The computer program on a computer readable medium of claim 20, wherein the classified area is external to the endpoint computer.

* * * * *